(12) United States Patent
Walter et al.

(10) Patent No.: US 8,968,851 B2
(45) Date of Patent: Mar. 3, 2015

(54) PEROXIDE CROSSLINKED ETHYLENE POLYMER PRESSURE PIPE AND A METHOD FOR THE PREPARATION THEREOF

(75) Inventors: Philipp Walter, Freiburg (DE); Anneli Pakkanen, Stenungsund (SE); Jeroen Oderkerk, Stenungsund (SE); Magnus Palmlof, Vastra Frolunda (SE); Lars Hojer, Ytterby (SE); Bill Gustafsson, Stenungsund (SE); Tore Dreng, Larvik (NO)

(73) Assignee: Borealis Technology Oy (FI)

( * ) Notice: Subject to any disclaimer, the term of this patent is extended or adjusted under 35 U.S.C. 154(b) by 1246 days.

(21) Appl. No.: 10/592,633

(22) PCT Filed: Mar. 8, 2005

(86) PCT No.: PCT/EP2005/002591
§ 371 (c)(1),
(2), (4) Date: Aug. 29, 2007

(87) PCT Pub. No.: WO2005/095838
PCT Pub. Date: Oct. 13, 2005

(65) Prior Publication Data
US 2008/0226858 A1    Sep. 18, 2008

(30) Foreign Application Priority Data
Mar. 12, 2004 (EP) ..................... 04445027

(51) Int. Cl.
*F16L 9/12* (2006.01)
*B32B 1/08* (2006.01)

(52) U.S. Cl.
CPC ..................... *F16L 9/12* (2013.01)
USPC ........... 428/36.9; 264/634; 525/333.8

(58) Field of Classification Search
CPC ............. B32B 1/08; F16L 9/12; F16L 9/127; F16L 11/04; C08L 23/04; C08L 23/06
USPC ............... 428/36.9, 36.91, 36.92; 525/333.8; 264/634
See application file for complete search history.

(56) References Cited

U.S. PATENT DOCUMENTS

| | | | | |
|---|---|---|---|---|
| 5,338,589 A | * | 8/1994 | Bohm et al. | 428/36.9 |
| 5,798,427 A | * | 8/1998 | Foster et al. | 526/352 |
| 6,325,959 B1 | * | 12/2001 | Ek et al. | 264/209.5 |
| 7,411,023 B2 | | 8/2008 | Palmlof | |

FOREIGN PATENT DOCUMENTS

| | | |
|---|---|---|
| EP | 0 989 141 A1 | 3/2000 |
| JP | 10-193468 | 7/1998 |
| JP | 11-320651 | 11/1999 |
| JP | 2000-9265 | 1/2000 |
| WO | WO 93/19924 A1 | 10/1993 |
| WO | WO 99/35652 | 7/1999 |
| WO | WO 00/01765 | 1/2000 |
| WO | WO 03/033586 A1 | 4/2003 |

OTHER PUBLICATIONS

Encyclopedia of Polymer Science and Technology, Second Ed., vol. 4, Wiley (1985), p. 350.
Hjertberg, T. et al. "Chemical Reactions in Crosslinking of Copolymers of Ethylene and Vinyltrimethoxy Silane", J. Appl. Pol. Sci, vol. 42, 1991, pp. 1185-1191.
Parks, L. "Radiation Crosslinking of Polymers", Sterigenics Advanced Applications, Feb. 2, 2010.
Bhattacharya, A. et al. Ed., "Polymer Grafting and Crosslinking", Wiley, 2009, pp. 229.
Richard, K. et al. "Strengthened Pipes from Ziegler Polythene", Plastics, Dec. 1961, pp. 111-114.
Starck et al., "Thermal and Rheological Studies on the Molecular Composition and Stracture of Metallocene- and Ziegler- Natta-Catalyzed Ethylene-α-Olefin Copolymers," Hournal of Applied Polymer Science, vol. 83, pp. 1140-1156 (2002).

* cited by examiner

*Primary Examiner* — Erik Kashnikow
(74) *Attorney, Agent, or Firm* — Merchant & Gould P.C.

(57) ABSTRACT

A peroxide crosslinked ethylene polymer pressure pipe and a method for the preparation thereof are described. The pipe is characterized in that it comprises an ethylene polymer with a density of less than 950 kg/m$^3$ obtained by polymerization with a single-site catalyst and having a shear thinning index, $SHI_{5/300}$ of less than 20 and a MWD of <10. The method is characterized in that it comprises polymerizing ethylene, optionally together with at least one comonomer, with a single-site catalyst to provide the above defined ethylene polymer, forming the ethylene polymer into a pipe by extrusion and crosslinking it.

16 Claims, 1 Drawing Sheet

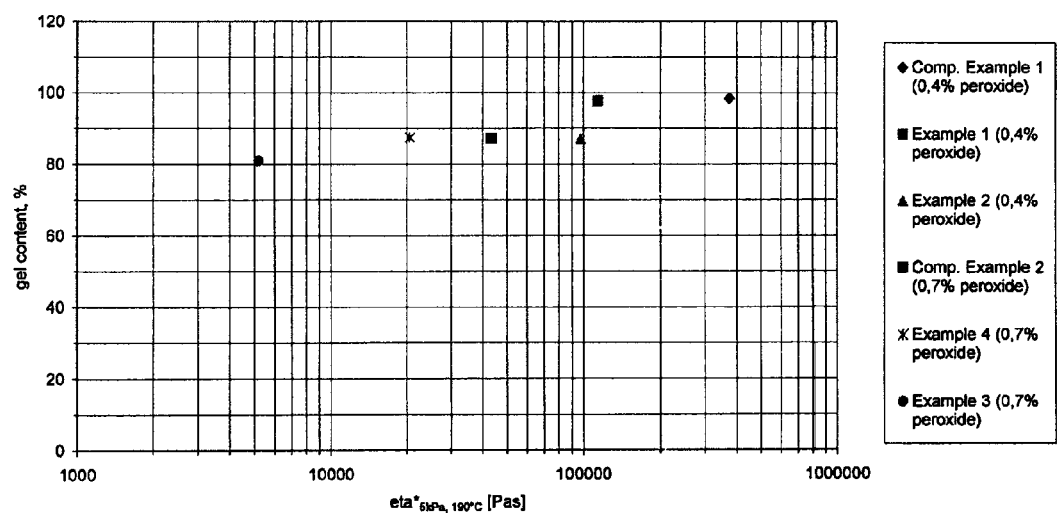

PEROXIDE CROSSLINKED ETHYLENE POLYMER PRESSURE PIPE AND A METHOD FOR THE PREPARATION THEREOF

FIELD OF THE INVENTION

The present invention relates to a peroxide crosslinked ethylene polymer pressure pipe, and a method for the preparation thereof.

BACKGROUND OF THE INVENTION

Nowadays, polymer materials are frequently used for pipes for various purposes, such as fluid transport, i.e. transport of liquid or gas, e.g. water or natural gas, during which the fluid can be pressurised. Moreover, the transported fluid may have varying temperatures, usually within the temperature range from about 0° C. to about 100° C. Such pipes are preferably made of polyolefin plastic, usually unimodal polyethylene such as medium density polyethylene (MDPE; density: 0.930-0.942 g/cm$^3$) and high density polyethylene (HDPE; density: 0.945-0.965 g/cm$^3$).

According to WO 00/01765 a polymer composition intended for pressurised pipes for the transport of gases and liquids such as cold water is known. The composition comprises a multimodal polyethylene with a density of 0.930-0.965 g/cm$^3$, an MFR$_5$ of 0.2-1.2 g/10 min, an M$_n$ of 8000-15000, an M$_w$ of 180–330×10$^3$, and an M$_w$/M$_n$ of 20-35. The multimodal polyethylene further comprises a low molecular weight (LMW) ethylene homopolymer fraction and a high molecular weight (HMW) ethylene copolymer fraction, said HMW fraction having a lower molecular weight limit of 3500, and a weight ratio of the LMW fraction to the HMW fraction of (35-55):(65:45).

According to WO 03/033586 a polymer pipe for hot fluids (temperature at least 60° C., usually 60-100° C., such as 70-90° C.) is known. The polymer pipe is characterised in that it comprises a multimodal polyethylene with a high molecular weight (HMW) fraction and a low molecular weight (LMW) fraction where said HMW fraction has a density of at least 0.920 g/cm$^3$, and that the multimodal polyethylene has a time to failure at 95° C. and 3.6 MPa of at least 165 h determined according to DIN 16 833 and a modulus of elasticity of at most 900 MPa determined according to ISO 527-2/1B.

Crosslinking improves e.g. heat deformation resistance of polyethylene and therefore pipes for hot water applications, such as pipes for floor heating, or for hot water distribution are usually made of crosslinked polyethylene (PEX). However, prior art pipes such as pipes of crosslinked unimodal high density polyethylene (HDPE-X) have several drawbacks. Thus, in order to meet the high demands of the so-called HDPE-X norm for hot and cold water applications (e.g. DIN 16 892/prEN ISO 12318) it is necessary to use polyethylene of a relatively high density. This entails that the resulting pipe is relatively stiff. This stiffness becomes even more pronounced when barrier layers are applied on top of or within the core pipe.

In order to improve the crosslinking response and hence reduce the consumption of crosslinking agent, e.g. peroxide, when crosslinking pipes of polyethylene, it is generally desired to use an ethylene polymer of relatively low melt flow rate (MFR), i.e. high molecular weight. However, this results in the drawback of poor processability, i.e. a reduced line speed at extrusion.

Another problem that may arise is insufficient melt strength when using polymers having a higher MFR in order to achieve better extrudability. In a pipe manufacturing system, where pipes are extruded and crosslinked in a separate system, melt strength is required to keep dimensional stability of the partly molten, uncrosslinked pipe until it becomes crosslinked. In the worst case, lack of melt strength means that it may not be possible to prepare a pipe from the polymer, because the polymer parison collapses when it exits from the extruder. Higher MFR resins also have poorer crosslinkability, which results in that a larger amount of crosslinking agent or a stronger irradiation dose must be used.

It is an object of the present invention to eliminate or alleviate the above mentioned problems of the prior art and provide a polymer composition with improved crosslinking response and flexibility and with good processability into a pipe.

SUMMARY OF THE INVENTION

According to the present invention it has been discovered that the above mentioned problems and drawbacks of crosslinked PE polymer pipes for fluids such as cold and hot water, can be overcome or alleviated by using a specific polymer composition for the pipe. More particular, the polymer is an ethylene polymer prepared by single-site catalysed polymerisation and having a low density and a narrow molecular weight distribution. The use of a single-site catalysed ethylene polymer gives better pressure test performance for a given density level than corresponding prior art materials. Therefore, a polymer of lower density may be used which results in a more flexible pipe. Moreover, a polymer of lower density also requires less energy to melt which is beneficial in respect of costs for the pipe manufacturing process. Further, by the use of single-site catalysed low MFR polymer, a lower amount of crosslinking agent is needed to reach the required degree of crosslinking. Alternatively, a lower molecular weight resin can be used, still reaching a high crosslinking degree. The lower molecular weight means improved processability in extrusion leading to enhancement of production speed can be achieved.

Thus, according to one aspect the present invention provides a peroxide crosslinked ethylene polymer pressure pipe, characterised in that it comprises an ethylene polymer with a density of less than 950 kg/m$^3$ obtained by polymerisation with a single-site catalyst and having a shear thinning index, SHI$_{5/300}$ of less than 20 and a MWD of <10.

According to another aspect the present invention provides a method of preparing a peroxide crosslinked ethylene polymer pipe, characterised in that it comprises polymerising ethylene, optionally together with at least one co-monomer, with a single-site catalyst to provide an ethylene polymer with a density of less than 950 kg/m$^3$ and having a shear thinning index, SHI$_{5/300}$ of less than 20, forming the ethylene polymer into a pipe by extrusion and peroxide crosslinking it.

Other distinguishing features and advantages of the invention will appear from the following specification and the appended claims.

BRIEF DESCRIPTION OF THE DRAWING

FIG. 1 is a graph of the data in Comparative Examples 1 and 2 d Examples 1-4.

DETAILED DESCRIPTION OF THE INVENTION

A critical feature of the present invention is that the ethylene polymer is obtained by single-site catalysed polymerisation. As is well-known by the skilled person a single-site catalyst (SSC) is a type of catalyst with only one type of active site producing polymers with narrow molecular weight distribution and even comonomer distribution. Typical examples of single-site catalysts are metallocene catalysts which contain a metallocene compound of a transition metal. Single-site catalysts such as metallocene catalysts are well-known to the skilled person and no further particulars should therefore be necessary concerning this aspect. By way of example the following preferred single-site catalysts may, however, be mentioned:

Catalyst I: the metallocene complex bis-(n-butyl cyclopentadienyl)hafnium dichloride [(n-BuCp)$_2$HfCl$_2$];

Catalyst II: the metallocene complex bis-(n-butyl cyclopentadienyl)zirconium dichloride [(n-BuCp)$_2$ZrCl$_2$]; and Catalyst III: the metallocene complex bis-(n-butyl cyclopentadienyl)hafnium dibenzyl [(n-BuCp)$_2$Hf(CH$_2$Ph)$_2$].

The preferred cocatalyst to be used with these single-site catalysts is methyl alumoxane (MAO).

Preferably the catalyst is supported on a carrier, such as silica.

The resin prepared by the single-site catalysed polymerisation of the invention is an ethylene polymer. This ethylene polymer may be an ethylene homopolymer or copolymer.

The ethylene polymer is at least unimodal. Thus, it may be unimodal or multimodal. The "modality" of a polymer refers to the form of its molecular weight distribution curve, i.e. the appearance of the graph of the polymer weight fraction as function of its molecular weight. If the polymer is produced in a several reactor process, utilizing reactors coupled in series and/or with reflux using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more reaction zones, is called bimodal or multimodal depending on the number of zones. In the following all polymers thus produced in two or more reactors are called "multimodal". It is to be noted here that also the chemical compositions of the different fractions may be different. Thus one or more fractions may consist of an ethylene co-polymer, while one or more others may consist of ethylene homopolymer.

Preferably, the ethylene polymer is unimodal or bimodal. Most preferably it is unimodal.

When the ethylene polymer is a copolymer and includes a comonomer, such as e.g. a bimodal ethylene polymer comprising a low molecular weight fraction of ethylene homopolymer and a high molecular weight fraction of an ethylene copolymer, the comonomer may be selected from various alpha-olefins with 3-8 carbon atoms and linear and substituted polyunsaturated copolymers. Also, the use of dienes as comonomer increases the level of unsaturation in the polymer and thus is a way to further enhance crosslinkability. Preferably, the comonomer is selected from the group consisting of 1-butene, 1-hexene, 4-methyl-1-pentene, 1-octene, 1,7-octadiene and 7-methyl-1,6-octadiene. The amount of comonomer is preferably such that it comprises 0-3 mol %, more preferably 0-1.5 mol % and most preferably 0-0.5 mol % of the ethylene polymer.

The proportions of the low molecular weight and high molecular weight fractions (also known as the "split" between the fractions) should be selected properly. More particularly, it is preferred that the weight ratio between the low molecular weight fraction and the high molecular weight fraction lies in the range (30-70):(70-30), more preferably (40-60):(60-40).

For the preparation of the ethylene polymer of the present invention polymerisation methods well known to the skilled person may be used, with the proviso that the catalyst is a single-site catalyst as described above.

The polymer pipe of the present invention is peroxide crosslinked. Peroxide crosslinking of polyethylene is previously known. In peroxide crosslinking, the crosslinking takes place by the addition of peroxide compounds, such as dicumyl peroxide, which form free radicals.

A characterising feature of the ethylene polymer of the present invention is that it has a low density of less than 950 kg/m$^3$, preferably at most 947 kg/m$^3$, and most preferably 932-947 kg/m$^3$. This low density which is made possible by the single-site catalysed polymerisation of the ethylene polymer, has several advantages. The low density of the polymer means that the pipe prepared therefrom is more flexible. This is of importance inter alia for pipes intended, e.g. for floor heating. Further, a lower density of the ethylene polymer base resin means a lower crystallinity which in turn means that less energy is required to melt the polymer. This results in an enhanced production speed when manufacturing the pipe. Still further and importantly, the low density/crystallinity single-site catalysed ethylene polymer of the present invention surprisingly gives the same or improved pressure test performance as prior art materials with higher density/crystallinity. Another way of expressing this is that a certain pressure test performance can be obtained with a more flexible pipe according to the present invention than with a traditional material with higher density and crystallinity.

The single-site catalysed ethylene polymer of the present invention has a narrow molecular weight distribution as defined by its shear thinning index (SHI). The SHI is the ratio of the complex viscosity ($\eta^*$) at two different shear stresses and is a measure of the broadness (or narrowness) of the molecular weight distribution. According to the present invention the ethylene polymer has a shear thinning index SHI$_{5/300}$, i.e. a ratio of the complex viscosity at 190° C. and a shear stress of 5 kPa ($\eta^*_5$) and the complex viscosity at 190° C. and a shear stress of 300 kPa ($\eta^*_{300}$), of less than 20, preferably less than 15.

Another way to measure molecular weight distribution (MWD) is by GPC. Apparent molecular weights (Mw and Mn) and molecular weight distribution (MWD, Mw/Mn) were determined using a Waters 150CV+ instrument equipped with both refractometer index (RI) and intrinsic viscosity detectors. The samples were dissolved in trichlorobenzene and the measurements were carried out at 140° C. The GPC was calibrated with narrow MWD polystyrene standards and the calibration curve was converted to linear polyethylene using the Mark-Houwink constants.

The molecular weight distribution (MWD value) as measured by the above explained GPC method is according to the present invention less than 10, preferably less than 7 and most preferably less than 5. The narrow molecular weight distribution of the ethylene polymer of the present invention gives the benefit of enhanced crosslinkability, i.e. less peroxide or radiation is required to obtain a certain crosslinking degree compared to known pipe polymers such as CrO$_3$ catalysed polymers. Alternatively, at a predetermined amount of peroxide or irradiation, a lower molecular weight (higher MFR) polymer may be used. According to the present invention the absence of very low molecular weight tail in single-site catalyst polymers results in improved crosslinkability. Low molecular weight polymers require a higher amount of peroxide to achieve an efficient network structure.

It is another preferred feature of the present invention that it allows the use of a single-site catalyst ethylene polymer of low molecular weight while still obtaining a good crosslinking response. This is illustrated by the complex viscosity at a shear stress of 5 kPa/190° C., η* (at 5 kPa, 190° C.), which is an indirect measure of the molecular weight. Above a critical molecular weight $M_c$ the low shear rate viscosity of linear polymer melts scales exponentially with molecular weight, i.e. $\eta_0 = KM_w^{3.4}$ (see Dealy, J. M. and Wissburn K. F. *Melt rheology and its role in plastics processing*, Van Nostrand Rheinhold, New York, 1990). According to a preferred embodiment of the invention the ethylene polymer has a complex viscosity at a shear stress of 5 kPa/190° C., $\eta^*_{5\ kPa/190°\ C.}$, of at least 5000 Pa·s, more preferably at least 25 000 Pa·s.

According to yet another preferred feature of the invention the ethylene polymer has a $MFR_{21}$ of 0.1-40 g/10 min, more preferably 0.1-15 g/10 min. The MFR or melt flow rate is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and at different loadings such as 2.16 kg ($MFR_2$), 5.0 kg ($MFR_5$) or 21.6 kg ($MFR_{21}$).

Generally, polymer pipes are manufactured by extrusion, or, to a smaller extent, by injection moulding. A conventional plant for screw extrusion of PEX polymer pipes comprises a single or double screw extruder, a nozzle, a calibrating device, a crosslinking unit, cooling equipment, a pulling device, and a device for cutting or for coiling-up the pipe. The polymer, pre-soaked with a suitable amount of peroxide is extruded into a pipe from the extruder and thereafter the pipe is crosslinked in the crosslinking unit. This process step requires that the pipe has sufficient melt strength so that the uncrosslinked pipe does not collapse before it gets to the crosslinking unit. This screw extrusion technique is well known to the skilled person and no further particulars should therefore be necessary here concerning this aspect.

Another type of extrusion of polymer pipes is the so-called ram extrusion where peroxide soaked polymer powder is charged batchwise into an extrusion cylinder and compressed with a ram in the heated zone of the extrusion cylinder. Melting and crosslinking of the polymer takes place simultaneously. After a charge has been pressed the ram is lifted, the crosslinked pipe is expelled and another charge of polymer is metered into the extrusion cylinder.

The pipe of the present invention is prepared by extrusion and more particularly by screw extrusion or ram extrusion.

As indicated above, a problem that may be encountered, particularly when increasing the output by using a polymer having a higher MFR, when extruding a polymer pipe and crosslinking it in a separate, downstream crosslinking unit, is that the polymer parison that leaves the extruder has insufficient melt strength. This may result in that the parison collapses so that it is not possible to prepare a pipe.

According to a preferred embodiment of the invention this problem of insufficient melt strength is overcome by adding a small amount of peroxide to the polymer before the extrusion in order to decompose the peroxide during the extrusion and introducing long-chain branching in the polymer. The long-chain branching introduced during the extrusion affords the polymer that leaves the extruder with enhanced melt strength so that the pipe parison does not collapse, but maintains its shape until it reaches the downstream crosslinking unit where it is crosslinked to the final crosslinking degree. The peroxide added to introduce long-chain branching should have a decomposition temperature below about 150° C. in order to decompose readily during the extrusion. The amount of such peroxide added should be enough to introduce the desired amount of long-chain branching, and should preferably be less than 500 ppm, more preferably 50-500 ppm, and still more preferably 100-500 ppm. The peroxide used for the crosslinking of the pipe in the downstream crosslinking unit should have a higher decomposition temperature such as at least 150° C., preferably at least 160° C., and more preferably 160-200° C. The higher decomposition temperature of this second peroxide should ascertain that it does not decompose prematurely during the extrusion of the polymer.

In order to further facilitate the understanding of the invention, it will now be illustrated by way of non-limiting examples of preferred embodiments as well as comparative examples outside the invention.

EXAMPLES

Example 1

In a 17 liters polymerisation reactor ethylene was polymerised with the above identified silica supported Catalyst I with MAO as cocatalyst into a unimodal ethylene polymer (SSPE R2). Four batches of polymer were prepared and combined by dry blending into 10 kg of polymer. The polymerisation medium was iso-butane, temperature 90° C., ethylene partial pressure 7.5 bar and continuous ethylene feed.

The resulting polymer had a density (ISO 1183-1987 E) of 940 kg/m³, an $SHI_{5/300}$ of 4.5, an $\eta^*_{5\ kPa/190°\ C.}$ of 114 200 Pa·s, an $MFR_{21}$ of 1.2 g/10 min, a $M_w$ (GPC) of 280 000 g/mole, and a MWD value of 2.3. The gel content of the polymer (determined according to ASTM D 2765) was 98% with 0.4% peroxide, di-tert-butyl-peroxide (DTBP).

Example 2

In a 8 liters polymerisation reactor ethylene was polymerised in iso-butane, 54° C., ethylene partial pressure 9.8 bar and continuous ethylene feed into a unimodal polyethylene with the above identified Catalyst III with MAO as cocatalyst. Ten batches were produced and combined.

The resulting polymer had a density of 946 kg/m³, $SHI_{5/300}$ of 4.0, $\eta_{5\ kPa/190°\ C.}$ of 101 500 Pa·s, an $MFR_{21}$ of 1.0 g/10 min, a $M_w$ (GPC) of 315 000 g/mole, and a MWD of 2.3.

Example 3

In a 17 liters polymerisation reactor ethylene was polymerised with the above identified silica supported Catalyst II with MAO as cocatalyst into a unimodal ethylene polymer (SSPE R3). Four batches of polymer were pre-pared and combined by dry blending into 10 kg of polymer. Medium iso-butane, temperature 90° C., ethylene partial pressure 7.5 bar. Continuous ethylene and hydrogen feed.

The resulting polymer had a density of 952 kg/m³, an $SHI_{5/300}$ of 3.2, an $\eta^*_{5\ kPa/190°\ C.}$ of 5 200 Pa·s, an $MFR_{21}$ of 31 g/10 min, a $M_w$ (GPC) of 120000 g/mole, and a MWD of 2.2. The gel content of the polymer (determined according to ASTM D 2765) was 49% with 0.4% peroxide, DTBP and 81% with 0.7% peroxide.

Example 4

In a 8 liters polymerisation reactor ethylene was polymerised with the above identified silica supported Catalyst I with MAO as cocatalyst into a bimodal ethylene polymer (SSPE 2157-6). Six batches of polymer were prepared and combined by dry blending.

The resulting polymer had a density of 946.9 kg/m³, an $SHI_{5/300}$ of 9.2, an $\eta^*_{5\ kpa/190°\ C.}$ of 20 500 Pa·s, an $MFR_{21}$ of 10.5 g/10 min, a $M_w$ (GPC) of 160 000 g/mole and a MWD of 3.4. The gel content of the polymer (determined according to ASTM D 2765) was 65% with 0.4% peroxide, DTBP and 87% with 0.7% peroxide.

Example 5

Polymers of the present invention and comparative prior art polymers were used to prepare crosslinked pipes. The polymers used were as follows:
Polymer A (SSPE resin R2): the polymer of Example 1;
Polymer B (SSPE R8-2): the polymer of Example 2;
Polymer C (SSPE 40927): In a 8 liters polymerisation reactor ethylene was polymerised in two steps with silica supported Catalyst III with iso-butane as the reaction medium and a polymerisation temperature of 75° C. The total polymerisation pressure was 19.3 bar in the first step. Hydrogen was used in an amount to yield a polymer with a $MFR_2$ of 100 g/10 min. In the second step, high molecular weight copolymer was produced with co-monomer 1-hexene. Ten batches were produced and dry blended to 10 kg. The polymer had a density of 947.5 kg/m³, an $\eta^*_{5\ kpa/190°\ C.}$ of 28 000 Pa·s, an $MFR_{21}$ of 2.4 g/10 min, an $SHI_{5/300}$ of 12.5, a $M_w$ of 210 000 and MWD of 7.0.

The polymer was crosslinked and run into 16×2 mm pipes in a screw extrusion PEX-a process with a separate crosslinking unit. The uncrosslinked polymer melt had sufficient melt strength upon exit from extrusion.
Polymer D (SSPE 40913): In a 8 liters polymerisation reactor ethylene was polymerised with silica supported Catalyst III with iso-butane as the reaction medium and a polymerisation temperature of 96° C. The ethylene partial pressure was 7.2 bar. The feed of ethylene was continuous with 45 ppm $H_2$. Ten batches were produced and combined. The polymer had a density of 947 kg/m³, an $\eta^*_{5\ kPa/190°\ C.}$ of 39 900 Pa·s, an $MFR_{21}$ of 2.2 g/10 min, an $SHI_{5/300}$ of 3.9, a $M_w$ of 240 000 and MWD of 2.3.

The presoaked polymer was crosslinked and run into 16×2 mm pipes in a screw extrusion PEX-a process with a separate crosslinking unit. The polymer material had good crosslinkability as gel content of the pipes was 79% with 0.5% peroxide, 2,5-dimethyl-2,5-di(tert-butylperoxy)-hexyne (DYBP).

Comparative Example 1

Polymer G: a comparative $CrO_3$ catalysed unimodal ethylene polymer with a density of 955 kg/m³, an $\eta^*_{5\ kpa/190°\ C.}$ of 374 800 Pa·s, an $MFR_{21}$ of 3 g/10 min, and an $SHI_{5/300}$ of 91. The gel content of the polymer (determined according to ASTM D 2765) was 98% with 0.4% peroxide, DTBP.

Comparative Example 2

Polymer H: a comparative $CrO_3$ catalysed unimodal ethylene polymer with a density of 956 kg/m³, an $\eta^*_{5\ kpa/190°\ C.}$ of 43 400 Pa·s, an $MFR_{21}$ of 11 g/10 min, and an $SHI_{5/300}$ of 33. The gel content of the polymer (determined according to ASTM D 2765) was 87% with 0.7% peroxide.

Comparative Example 3

Polymer I: a comparative $CrO_3$ catalysed unimodal ethylene polymer with a density of 944 kg/m³, an $\eta^*_{5\ kpa/190°\ C.}$ of 50400 Pa·s, an $MFR_{21}$ of 10 g/10 min, and an $SHI_{5/300}$ of 38.

Due to their narrowness, polymers of the invention crosslink efficiently in a broad viscosity range. For example, at a fixed peroxide content a lower viscosity resin can be used and the crosslinking degree will still be the same (compare Examples 3 and 4 with Comparative Example 2; and Example 1 with Comparative Example 1). Alternatively, by using a slightly higher viscosity resin, less peroxide may be used to obtain a certain crosslinking degree (compare Example 2 with Comparative Example 2).

Pressure Performance

Example 1 material (R2) was run into 16×2 mm pipes in RAM/Engel process. Gel content of the pipes was 92%.
Example 2 material (R8-2) was run into 16×2 mm pipes in RAM/Engel process. Gel content of the pipes was 78%.

The pipes were tested for pressure strength and flexibility. The pressure strength tests were carried out in accordance with DIN 16892/prEN 12318 at 95° C. and at a Hoop stress of 4.8; 4.6 and 4.4 MPa, respectively. The requirement at these conditions is a failure time of at least 1 h; 165 h and 1000 h, respectively, on a pipe crosslinked to ≥70% (peroxide); ≥60% (irradiation). The results appear from Table 1. It is concluded that the crosslinked pipes made from the material according to the invention meet the requirements. For example, material A (base resin density 940) gave results 18; 918, and >4 850 hours at 4.8; 4.6 and 4.4, respectively.

TABLE 1

| PEX Pipe made of | Base resin density kg/m³ | $SHI_{5/300}$ | Catalyst system | Temp ° C. | Pressure strength at 4.4 MPa (h) | Pressure strength at 4.6 MPa (h) | Pressure strength at 4.8 MPa (h) |
|---|---|---|---|---|---|---|---|
| Polymer A (invention) | 940 | 4.5 | Single-site | 95 | >4847 | 918 | 18 |
| Polymer B (invention) | 946 | 4.0 | Single-site | 95 | | >933 | >858 |

It is evident from Table 1 that due to their rheological narrowness, the polymers of the invention allow the use of a lower density of the base polymer while still meeting the pressure strength requirements. Furthermore, materials having a lower viscosity having sufficient crosslinkability may also be used.

Flexibility

The pipe flexibility was determined with flexural E-modulus test. Flexural E-modulus of crosslinked pipe samples was determined in a 3-point bending test in line with ISO 178, test speed 2 mm/min. For the test, 2.5×6 mm rectangular samples were cut from the 16 mm diameter crosslinked pipes in longitudinal direction. The samples were analyzed with the convex side up. The results appear from table 2.

TABLE 2

|  | Base resin density kg/m$^3$ | E-modulus of pipe sample | Density of pipe sample kg/m$^3$ |
|---|---|---|---|
| Comp. Ex. 1 | 955 | 382 (gel content 84%) | 934.4 (gel content 84%) |
| Comp. Ex. 3 | 944 |  | 929.6 (gel content 81%) |
| Example 1 | 940 | 251 (gel content 92%) | 925.7 (gel content 92%) |
| Example 2 | 946 | 336 (gel content 78%) | 927 (gel content 78%) |

Crosslinked pipes according to Comparative Example 1 are stiff and meet the pressure test performance requirements of the relevant standards. The crosslinked pipes of Comparative Example 3 are more flexible but do not pass the pressure performance requirements. The crosslinked pipes of Example 1 and 2 are flexible and meet the pressure performance requirements. Although the invention has been described above with reference to a specified ethylene polymer, it should be understood that this ethylene polymer may include various additives such as fillers, antioxidants, UV-stabilisers, processing aids, etc. as is known and conventional in the art. Further, the pipe made of the specified ethylene polymer may be a single-layer pipe or form part of a multilayer pipe including further layers of other pipe materials.

The invention claimed is:

1. A peroxide crosslinked ethylene polymer pressure pipe comprising a unimodal ethylene polymer with a density of 928-947 kg/m$^3$ and a MFR$_{21}$ of 0.1-40 g/10 min obtained by polymerisation with a single-site catalyst and having a shear thinning index, SHI$_{5/300}$ of less than 20 and a MWD of less than 10, and wherein the ethylene polymer of the pressure pipe is peroxide crosslinked.

2. A pipe as claimed in claim 1, wherein the ethylene polymer has a shear thinning index, SHI$_{5/300}$ of less than 15.

3. A pipe as claimed in claim 1, wherein the ethylene polymer has a complex viscosity at a shear stress of 5 kPa/190 C, $\eta^*_{5\ kPa/190\ C}$, of at least 5 000 Pa·s.

4. A pipe as claimed in claim 3, wherein the ethylene polymer has a complex viscosity at a shear stress of 5 kPa/190 C $\eta^*_{5\ kPa/190\ C}$, of at least 25 000 Pa·s.

5. A pipe as claimed in claim 1, wherein the crosslinked pipe has an outer diameter of 16 mm and a wall thickness of 2 mm and has a flexural E-modulus of less than 350 MPa.

6. A pipe as claimed in claim 1, wherein the ethylene polymer has a MFR$_{21}$ of 0.1-15 g/10 min.

7. A pipe as claimed in claim 1, wherein the ethylene polymer has a MFR$_{21}$ of 0.5-4 g/10 min.

8. A pipe as claimed in claim 1, wherein the ethylene polymer has a MWD of less than 7.

9. A pipe as claimed in claim 1, wherein the ethylene polymer has a MWD of less than 5.

10. A pipe as claimed in claim 1, wherein the unimodal ethylene polymer comprises long chain branching from peroxide having a decomposition temperature below 150° C. and crosslinking from peroxide having a decomposition temperature of at least 150° C.

11. A pipe as claimed in claim 10, wherein the unimodal ethylene polymer comprises crosslinking from peroxide having a decomposition temperature of at least 160° C.

12. A pipe as claimed in claim 10, wherein the unimodal ethylene polymer comprises crosslinking from peroxide having a decomposition temperature of 160° C. to 200° C.

13. A method of preparing a peroxide crosslinked ethylene polymer pressure pipe, the method comprising polymerizing ethylene, optionally together with at least one comonomer, with a single site catalyst to provide a unimodal ethylene polymer with a density of 928-947 kg/m$^3$, a MFR$_{21}$ of 0.1-40 g/10 min and having a shear thinning index, SHI$_{5/300}$ of less than 20 and a MWD of less than 10, and forming the unimodal ethylene polymer into a pipe by extrusion and peroxide crosslinking the unimodal ethylene polymer.

14. A method according to claim 13, wherein the ethylene polymer is peroxide crosslinked in a separate crosslinking step after the extrusion.

15. A method according to claim 14, wherein a peroxide that decomposes during the extrusion is added to the ethylene polymer before the extrusion for improved melt strength.

16. A method according to claim 15, wherein the peroxide that decomposes during the extrusion is added in an amount of less than 500 ppm.

* * * * *